US008315153B2

(12) United States Patent
Jia et al.

(10) Patent No.: US 8,315,153 B2
(45) Date of Patent: Nov. 20, 2012

(54) WIRELESS COMMUNICATIONS EQUIPMENTS WITH FUNCTION OF DETECTING RANDOM ACCESS SIGNAL, WIRELESS COMMUNICATIONS SYSTEMS WITH FUNCTION OF DETECTING RANDOM ACCESS SIGNAL AND METHOD OF RANDOM ACCESS SIGNAL DETECTION

(75) Inventors: Yunjian Jia, Kodaira (JP); Katsuhiko Tsunehara, Hachioji (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 439 days.

(21) Appl. No.: 12/535,723

(22) Filed: Aug. 5, 2009

(65) Prior Publication Data

US 2010/0034078 A1    Feb. 11, 2010

(30) Foreign Application Priority Data

Aug. 8, 2008   (JP) .................................. 2008-205188

(51) Int. Cl.
    *H04J 11/00*    (2006.01)
(52) U.S. Cl. ...................... 370/210; 370/252; 370/481
(58) Field of Classification Search .................. 370/210, 370/252, 343, 344, 480, 481
    See application file for complete search history.

(56) References Cited

U.S. PATENT DOCUMENTS

| 6,373,858 | B1 * | 4/2002 | Soleimani et al. | 370/476 |
| 7,554,955 | B2 * | 6/2009 | Li et al. | 370/335 |
| 2009/0040918 | A1 * | 2/2009 | Jiang et al. | 370/210 |

OTHER PUBLICATIONS

3GPP TS 36.211, V1.2.0, Evolved Universal Terrestrial Radio Access (E-UTRA), Physical Channels and Modulation (Release 8), Jul. 10, 2007.

* cited by examiner

*Primary Examiner* — Yemane Mesfin
*Assistant Examiner* — Mon Cheri Davenport
(74) *Attorney, Agent, or Firm* — Mattingly & Malur, PC

(57) ABSTRACT

A wireless communication equipment includes receive processing and transmit processing. The receive processing includes a Fourier transform unit that transforms all received signals to frequency region signals by Fourier transform. A demodulation unit demodulates the received signals from the Fourier-transformed frequency region signals. A random access detection unit that monitors signals in frequency regions of random access signals of the Fourier-transformed frequency region signals, and detects that the random access signals are received, by a change pattern of the signals in the frequency regions of random access signals in one transmission time interval.

10 Claims, 10 Drawing Sheets

WIRELESS COMMUNICATIONS EQUIPMENTS WITH FUNCTION OF DETECTING RANDOM ACCESS SIGNAL, WIRELESS COMMUNICATIONS SYSTEMS WITH FUNCTION OF DETECTING RANDOM ACCESS SIGNAL AND METHOD OF RANDOM ACCESS SIGNAL DETECTION

CLAIM OF PRIORITY

The present application claims priority from Japanese Patent Application JP 2008-205188 filed on Aug. 8, 2008, the content of which is hereby incorporated by reference into this application.

FIELD OF THE INVENTION

The present invention relates to wireless communication equipment with the function of detecting a random access signal, wireless communication systems with the function of detecting a random access signal, a method of random access signal detection, and a communication system that implements the method concerned.

BACKGROUND OF THE INVENTION

Presently, as standards of the next-generation mobile communication systems, LTE (Long Term Evolution) is specified by 3GPP (the 3rd Generation Partnership Project) as described in 3GPP TS 36.211 "Evolved Universal Terrestrial Radio Access (E-UTRA); Physical Channels and Modulation (Release 8)", Jul. 10, 2007. As the LTE specification, the SC-FDMA (Single-Carrier Frequency Division Multiple Access) method is used by which the PAPR (Peak-to-Average Power Ratio) of transmitted signals is suppressed in uplinks (communications from user equipment to a base station) of an LTE system to enable reduction in the load of a transmission power amplifier and longer battery life of the user equipment. The SC-FDMA is a frequency-division-based method. In addition to the SC-FDMA, OFDM (Orthogonal Frequency Division Multiplexing), OFDMA (Orthogonal Frequency Division Multiple Access), and the like are frequency-division-based methods.

SUMMARY OF THE INVENTION

Conventional wireless communication systems use the time regions or frequency regions correlation characteristics of transmitted random access signals to determine whether the transmitted random access signals are received. FIGS. 12 and 13 show a conventional detection method and device construction. FIG. 12 shows the construction of a method of detecting a time region by use of a MF (Matched Filter). The reference numeral 21 designates a Fourier transform unit for received data; 22, a data demodulation unit; 41, an MF (Matched Filter) unit; 42, a time region known sequence memory; and 43, a determining unit. The MF unit 41 calculates correlation between the time region known sequence and the received signals in a time region, and the determining unit 43 makes a determination. The time region known sequence in the time region known sequence memory is sampled from transmitted random access signals. Since the length of a generation sequence of random access signals is 839, the length of the time region known sequence must be 839 or greater.

On the other hand, FIG. 13 shows the construction of a detection method by processing in a frequency region. The reference numeral 51 designates a Fourier transform unit for random access signals; 52, a frequency region known sequence memory; 53, a multiplication unit; and 54, an inverse transform unit for random access signals. The Fourier transform unit for random access signals 51 transforms an input signal to a frequency region signal by Fourier transform, the multiplication unit 53 multiplies the transformed signal by the frequency region known sequence stored in the frequency region known sequence memory 52, and the inverse Fourier transform unit for random access signals 54 returns a resulting data string to a time region signal by inverse Fourier transform. The frequency region known sequence stored in the frequency region known sequence memory 52 has the same length 839 as the sequence mapped into subcarriers allocated in the transmitted random access signal. As the correlation of the time region is equivalent to the multiplication of the frequency region, the output of the inverse Fourier transform becomes equivalent to the output of the MF described previously.

Specifically, outputs of FIGS. 12 and 13 both correspond to a Delay Profile of the received signal, and the determining unit 43 of the base station determines from the Delay Profile whether a random access signal is received. In short, as shown in FIG. 14, it is determined that a random signal is received when a peak greater than noise level appears in the output amplitude of Delay Profile.

However, the above-described conventional method will bring about more computations in the base station and higher implementation costs. Especially, since detection methods using the MF are difficult to implement without modification because the length of wait is 839 or greater, more complicated methods such as switching between windows by use of the MF having a small number of taps are required. Furthermore, since the formats of a time region and a frequency region of transmitted random access signals are different from the format of data signals, a base station using the conventional methods requires an MF used only to detect random access signals or a dedicated Fourier transform unit meeting the format of random access signals, that is, a Fourier transform and an inverse Fourier transform that meet the structure of a random access signal.

A memory for a known sequence is also required, and the length of one known sequence is at least 839. Furthermore, when plural users are to be accommodated, more memory will be required. Therefore, random access signal detection by the conventional methods has a problem because of the large amount of computation and the high implementation costs.

A problem to be solved by the present invention is to reduce the amount of processing and costs in a base station that detects random access signals transmitted by user equipment to send transmission requests to the base station.

To solve the above-described problem, the present invention uses the difference between the format of transmitted random access signals and the format of transmitted data signals so that base stations detect random access signals, based on power change patterns reflecting the format difference.

A representative construction of the present invention follows. A wireless communication equipment of the present invention includes receive processing and transmit processing, wherein the receive processing includes: a Fourier transform unit that transforms all received signals to frequency region signals by Fourier transform; a demodulation unit that demodulates the signals in frequency regions of data within the Fourier-transformed frequency region signals; and a random access detection unit (function) that monitors signals in frequency regions of random access signals within the Fourier-transformed frequency region signals, and detects that the random access signals are received, by a change pattern of the signals in the frequency region in one transmission time interval.

By the present invention, reduction in the amount of processing and costs in base stations can be achieved.

DETAILED DESCRIPTION OF THE PREFERRED EMBODIMENTS

Hereinafter, embodiments of the present invention will be described with reference to the drawings. The present invention can apply to wireless communication systems such as a mobile communication system, cellular system, or cellular phone system. The following describes an example of application to femtocells.

First Embodiment

FIGS. 1 to 9 describe a first embodiment of the present invention.

Figure 1:
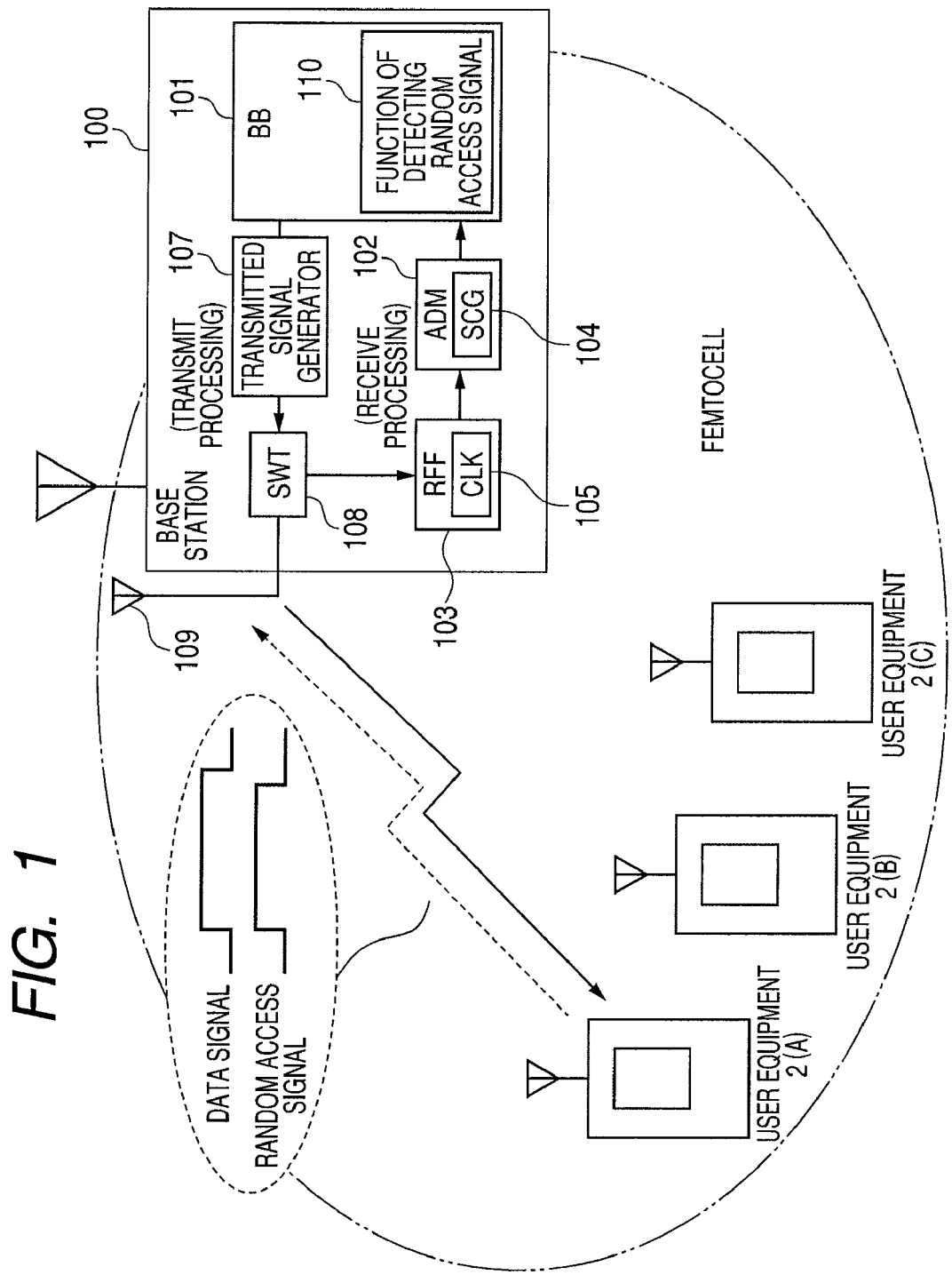
FIG. 1 illustrates a wireless communication system according to a first embodiment of the present invention.

Before describing the embodiment of the present invention detail, the following describes the system configuration of an uplink from a user equipment of the present invention to a base station. FIG. 1 is an image drawing of an uplink and a downlink in a femtocell according to the present invention. A femtocell has a communication area as small as several tens of meters in radius with an output of about 20 mW. The maximum number of user equipment 2 (A, B, C) that can be connected at the same time to a base station 100 is about four. The base station 100 includes a baseband unit (BB) 101 having a function for controlling signal transmission and reception, and a receive processing function (an A/D conversion unit 102, a RF front-end unit 103, and a clock signal source SCG 104 and CLK 105 for taking synchronization). Furthermore, it includes a transmit processing function including a transmitted signal generator 107 having an A/D conversion function and a transmission/reception changeover switch 108 for switching between transmission and reception, and an antenna 109. The baseband unit 101, which constitutes part of each of the transmit processing function and the receive processing function, has a random access signal detection unit (function) 110 for detecting the presence of a random access signal included in a received signal that is transmitted from the user equipment 2 and the like, in addition to various functions for generating and processing transmission/reception signals.

Each user equipment 2(A), 2(B) and 2(C) has a transmission/reception function, antenna, and a clock signal source for synchronization.

The uplink and the downlink adopt the system of frequency division base. The uplink adopts the SC-FDMA method having a small PAPR (peak-to-average power ratio) to reduce required peak power of a transmission power amplifier. The uplink using the SC-FDMA method includes an SC-FDMA data signal and a random access signal. On the other hand, the downlink adopts OFDMA to enable multi-access by dividing numerous orthogonal subcarriers to allocate them to plural users.

Figure 2:
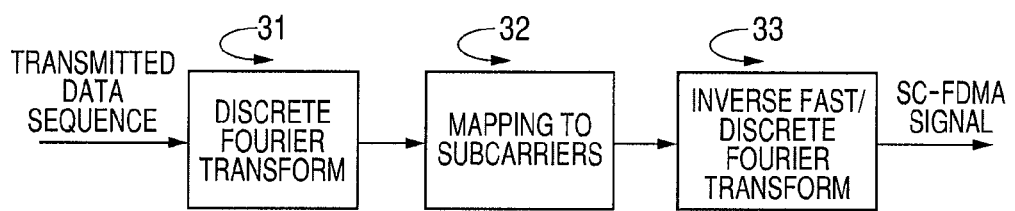
FIG. 2 illustrates an SC-FDMA method used in the first embodiment of the present invention.

The transmit processing of the user equipment 2 is constructed as shown in FIG. 2 to adopt the SC-FDMA method. That is, as shown in FIG. 2, a transmission processing side includes a DFT (Discrete Fourier Transform) unit 31, a subcarrier mapping unit 32, and an IFFT (Inverse Fast/discrete Fourier Transform) unit 33. After the DFT (Discrete Fourier Transform) unit 31 transforms the time region sequence, which is a transmission data, into a signal of a frequency region by a DFT (Discrete Fourier Transform), the transformed signal is inputted to the subcarrier mapping unit 32. In this case, in a system band, the frequency region signal is mapped into allocated subcarriers, and zero is inserted into unallocated subcarriers. The transmit processing of the user equipment 2 inputs the output of the subcarrier mapping unit 32 to the inverse fast/discrete Fourier transform unit 33. The inverse fast/discrete Fourier transform unit 33 transforms the inputted signal of the frequency region into a time region signal by the inverse/fast discrete Fourier transform (IFFT), and inserts a cyclic prefix (CP) at the start of the output to create a SC-FDMA transmission symbol. Plural transmission symbols outputted continuously form one transmission subframe. The transmission subframe is subjected to A/D conversion by the A/D conversion function, and transmitted from the antenna during one transmission time interval.

An uplink of the LTE standard has two types of transmission signals generated by the above-described SC-FDMA method. One is a data signal for transmitting information data, and the other is a random access signal transmitted to send a request for transmitting data signals to the base station. The formats of the two signals are different. In the LTE, the construction of a frequency region of the random access signal is standardized.

Figure 3:
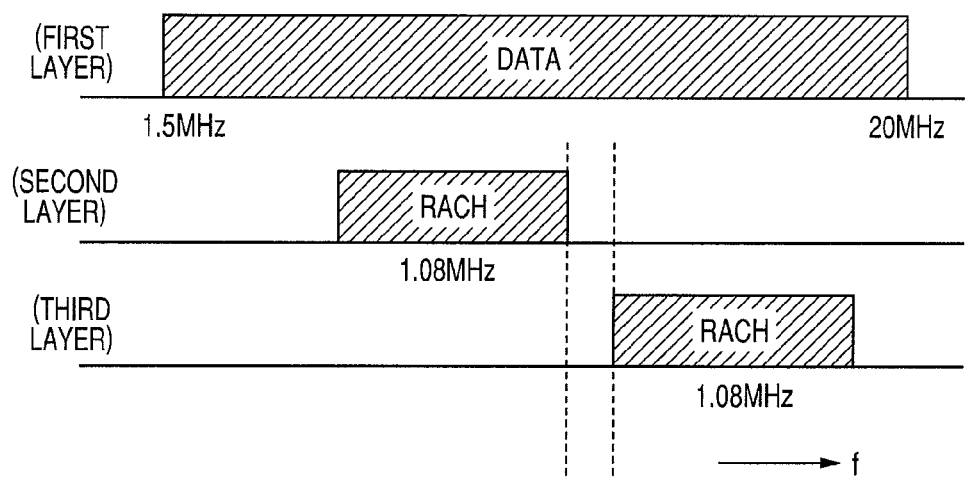
FIG. 3 shows part of a communication protocol of a transmission signal of the SC-FDMA method.

FIG. 3 shows part of a communication protocol of a transmission signal (frequency region) of the SC-FDMA method. A first layer is a layer of data signals from 1.5 MHz to 20 MHz, and second and third layers are layers of random access signals of 1.08 MHz.

Figure 4:
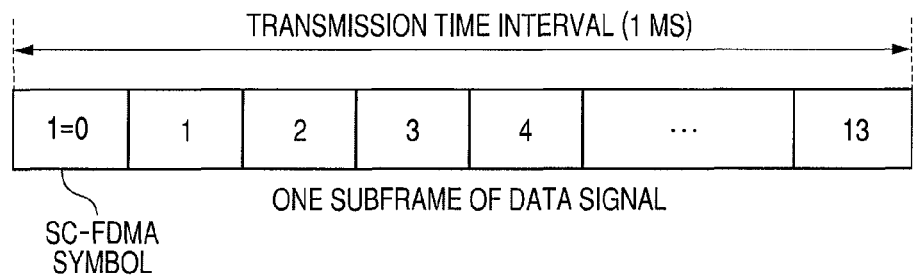
FIG. 4 shows the subframe format of a data signal.

FIG. 4 shows the format of a subframe of data signals. One subframe of data signals transmits 14 SC-FDMA transmission symbols and matches the time length of one transmission time interval.

Figure 5:
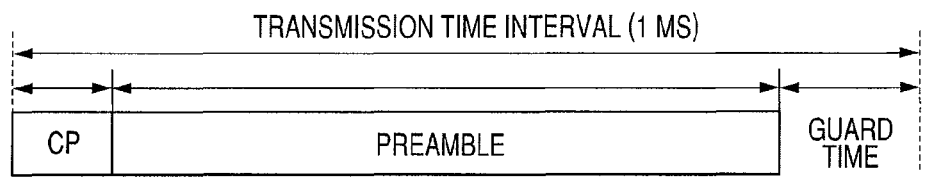
FIG. 5 shows the subframe format of a random access signal.

FIG. 5 shows the format of a random access signal. A defined random access signal contains only one transmission symbol in one subframe. The time length of the sum of a cyclic prefix (CP) and a signal body called preamble is 97 μs shorter than the time length of one transmission time interval. That is, no signal is transmitted during a time period of 97 μs called guard time. The band width of a random access signal is 1080 kHz. Each side of it is a guard band of 15 kHz having no signal. The central band includes 839 successive subcarriers, and a modulated signal is transmitted in the band. A subcarrier interval is 1.25 kHz. The modulated signal is generated from a Zadoff-Chu sequence signal having a length of 839.

In the system according to the present invention, the uplink has a system construction with transmission time intervals partitioned at a specific time interval. In each transmission time interval, data signals for transmitting voice and digital information, and random access signals for sending a request to transmit the data signals from the user equipment to the base station are transmitted.

Since the base station cannot determine whether a transmission request from the user equipment exists in one transmission time interval, the base station must always determine whether a random access signal is received. The following describes how the base station determines whether the random access signal is received, that is, an embodiment of the present invention is applied for detecting the random access signal.

Figure 6:
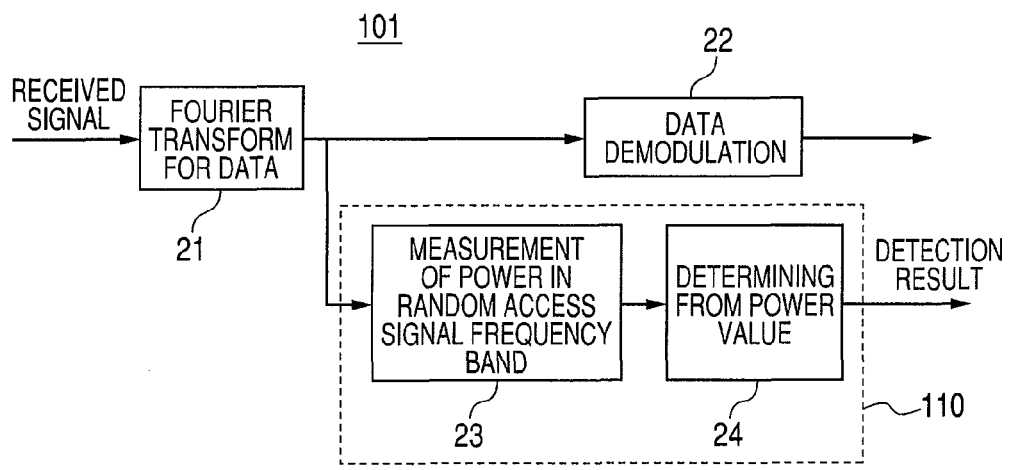
FIG. 6 shows the construction of a receiver to which the first embodiment of the present invention is applied.

An embodiment of a receive processing to which the present invention is applied is shown in FIG. 6. In FIG. 6, 21 designates a Fourier transform unit for transforming received signals; 22, a data demodulation unit; 23, a random access band power measuring unit; and 24, a random access signal detection determining unit. The random access band power measuring unit 23 and the random access signal detection determining unit 24 constitute a random access signal detection unit (function) 110 that inputs output of the Fourier transform unit for received signals 21.

Received signals are all inputted to the Fourier transform unit 21 for data reception and are transformed to signals of a frequency region by the fast Fourier transform (FFT), and its output of the frequency region allocated to the data is inputted to the data demodulation unit 22 for demodulation processing. On the other hand, all outputs of the Fourier transform unit 21 for data reception are also inputted to the power measuring unit 23 of the random access signal band to measure the power of a band portion used by a random access signal. The random access signal detection determining unit 24 determines from the change pattern of power values whether a random access signal is received.

Figure 7:
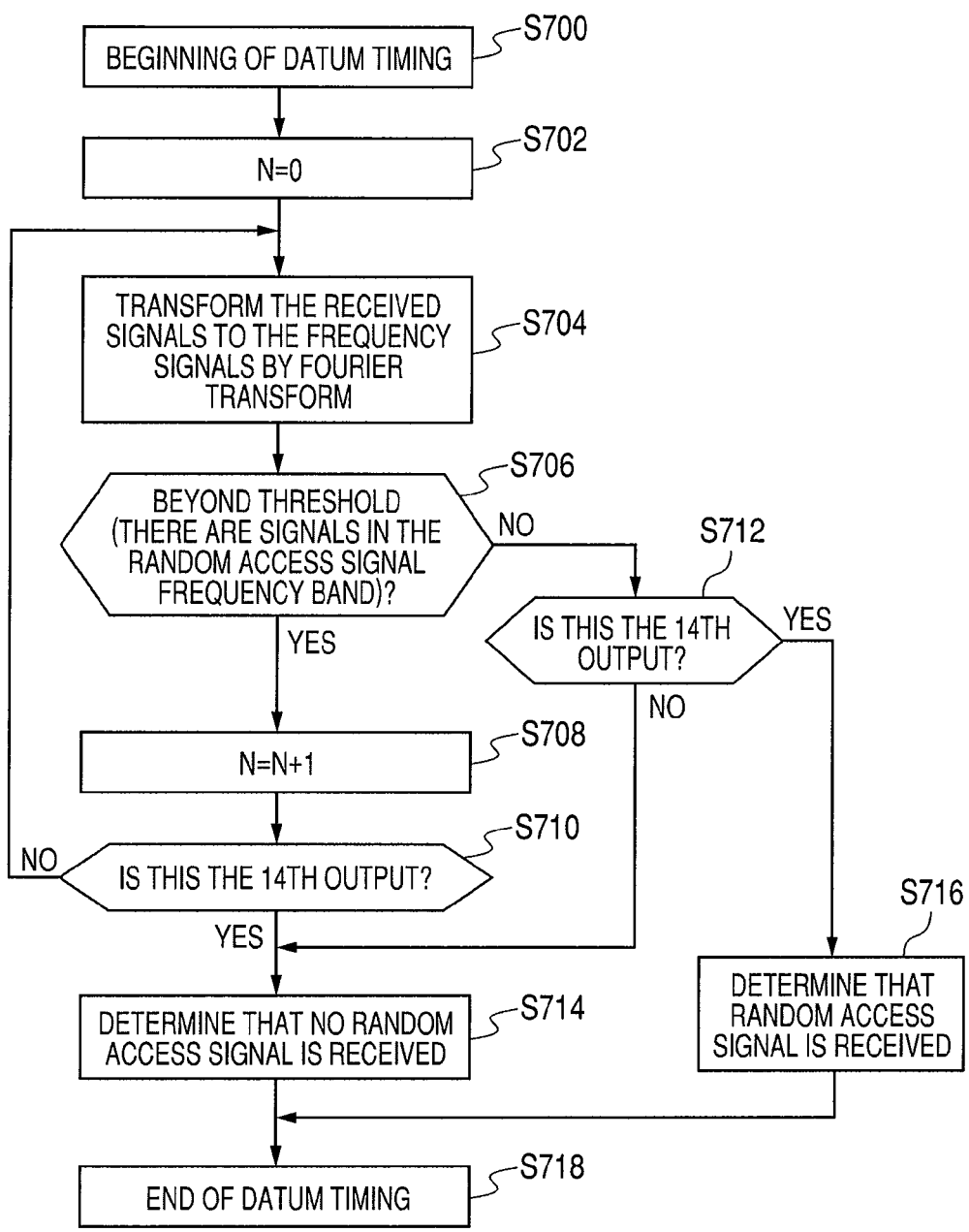
FIG. 7 is a processing flow of detection and judgment of a random access signal in the first embodiment of the present invention.

Referring to FIG. 7, the following describes a processing flow of the detection and judgment of a random access signal. The processing flow is activated at beginning of datum timing (S700). Namely, the processing flow is activated at sub-transmission time intervals into which one transmission time interval (e.g., 1 ms) is partitioned at a specific time interval, for example, datum timing (=1/14 ms) of one-fourteenth of the transmission time interval. Then, the processing flow sets N to zero (S702). Next, it transforms all the received signals to the frequency region signals by Fourier transform in the Fourier transform unit 21 for data reception (S704). Next, it checks whether there are signals beyond threshold. Namely, it compares signal power included in a certain band (random access band) in the frequency region with a preset threshold (S706). When the signal power included in the random access band is higher than the threshold, the processing flow adds one to N (S708), and further checks whether this is the fourteenth output (S710). When less than the fourteenth output, it returns to S704. On the other hand, when the signal power included in the random access band is less than the threshold, it checks whether this is the fourteenth output (S712). When it is determined in S710 that it is the fourteenth output, the processing flow determines that no random access signal is received (S714). On the other, when it is determined in S712 that it is the fourteenth output, it determines that a random access signal is received (S716). Then the processing is terminated at the end of datum timing. This terminates processing corresponding to one datum timing (S718).

Figure 8:
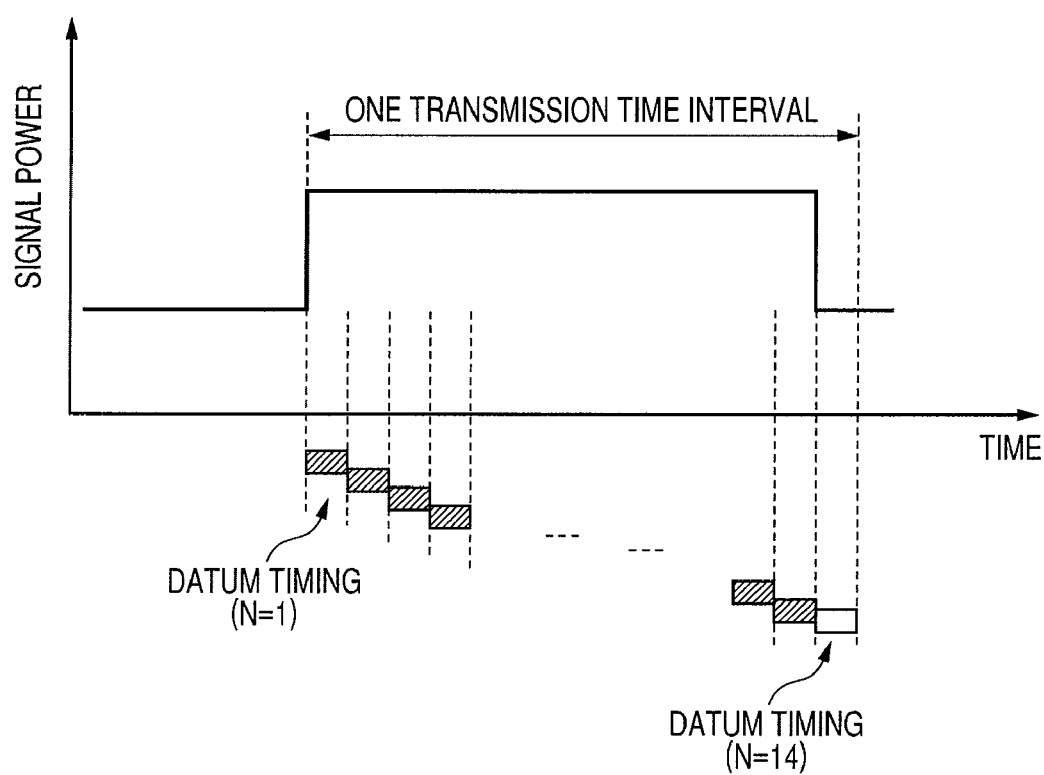
FIG. 8 illustrates detection and judgment operations on a random access signal.

Specifically, a random access signal has the characteristic that, as shown in FIG. 8, high signal power is maintained until the thirteenth datum timing, but the signal power changes to a low level at the fourteenth. On the other hand, a data signal has a high power level even at the fourteenth datum timing. Thus, by using the characteristics of the two types of signals and checking the band power level of received signals subjected to Fourier transform in the Fourier transform unit 21 for data reception by the function of detecting random access signal 110, it can be determined whether the received signal is a random access signal. In other words, a dedicated MF meeting the signal format of the random access signal, or both Fourier transform and inverse Fourier transform meeting the signal format of the random access signal can be omitted.

Figure 9:
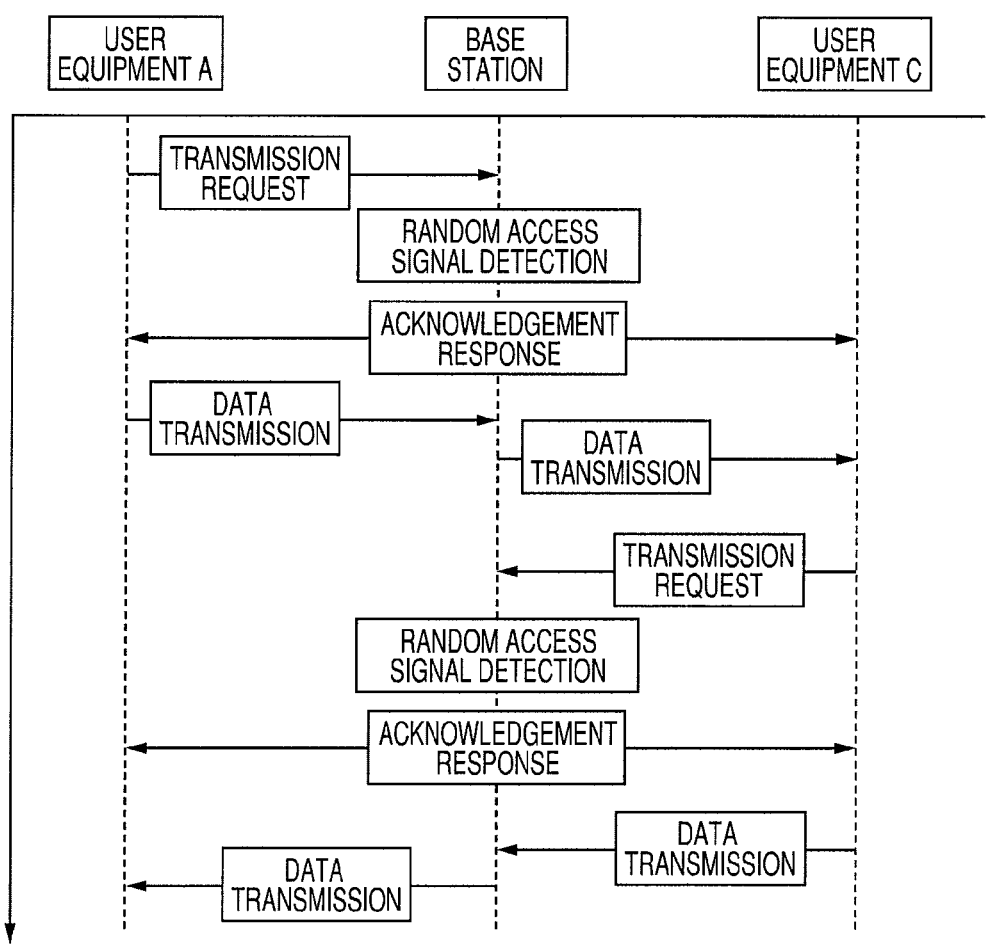
FIG. 9 is a time chart showing an example of user equipment performing communication within a femtocell according to the first embodiment.

With reference to a time chart of FIG. 9, the following describes this embodiment that performs communications within a femtocell. This embodiment assumes that user equipment A and C within a femtocell communicate with each other via a base station. In the system of the present invention, the uplink from the user equipment A to the base station has a transmission time interval (e.g., 1 ms) partitioned into smaller sub-time intervals at a fixed time interval. The user equipment A uses the transmission time interval to send a random access signal to issue a transmission request to the base station. However, the base station cannot know in advance whether a transmission request from the user equipment exists in one transmission time interval. Therefore, the base station always determines whether a random access signal is received, by the method shown in FIG. 7, to detect a random access signal having arrived at the base station. When a random access signal is detected, acknowledgement response is sent to user equipment within the femtocell through the downlink. As a result, a data signal in which voice and digital information are transmitted is transmitted from the user equipment A to the user equipment C via the base station.

When the user equipment C that has received the data signal has a request to transmit data to the user equipment A, similarly, the user equipment C sends a random access signal to the base station, and the base station detects the random access signal directed to the base station by the method shown in FIG. 7. In this way, communications are achieved between the user equipment A and C via the base station.

Thus, according to this embodiment, especially, in femtocell environments in which there are a small number of users, for example, in small-scale base stations operated indoor or within an office, the amount of computations and device costs can be reduced. Especially, in the method by which a base station detects a random access signal transmitted from a user equipment, a dedicated MF meeting the signal format of the random access signal, or both Fourier transform and inverse Fourier transform meeting the format of the random access signal can be omitted. Moreover, correlation computations or multiplication computations can also be omitted. Therefore, according to this embodiment, simplified base stations and reduction in costs can be achieved.

In the above descriptions, to provide complete understanding, the embodiment in which an uplink adopts the SC-FDMA system is described. It will be apparent that systems adopting frequency-division-based methods (e.g., OFDM and OFDMA) can implement the present invention because they can generate random access signals having the format shown in FIG. 5.

Second Embodiment

Figure 10:
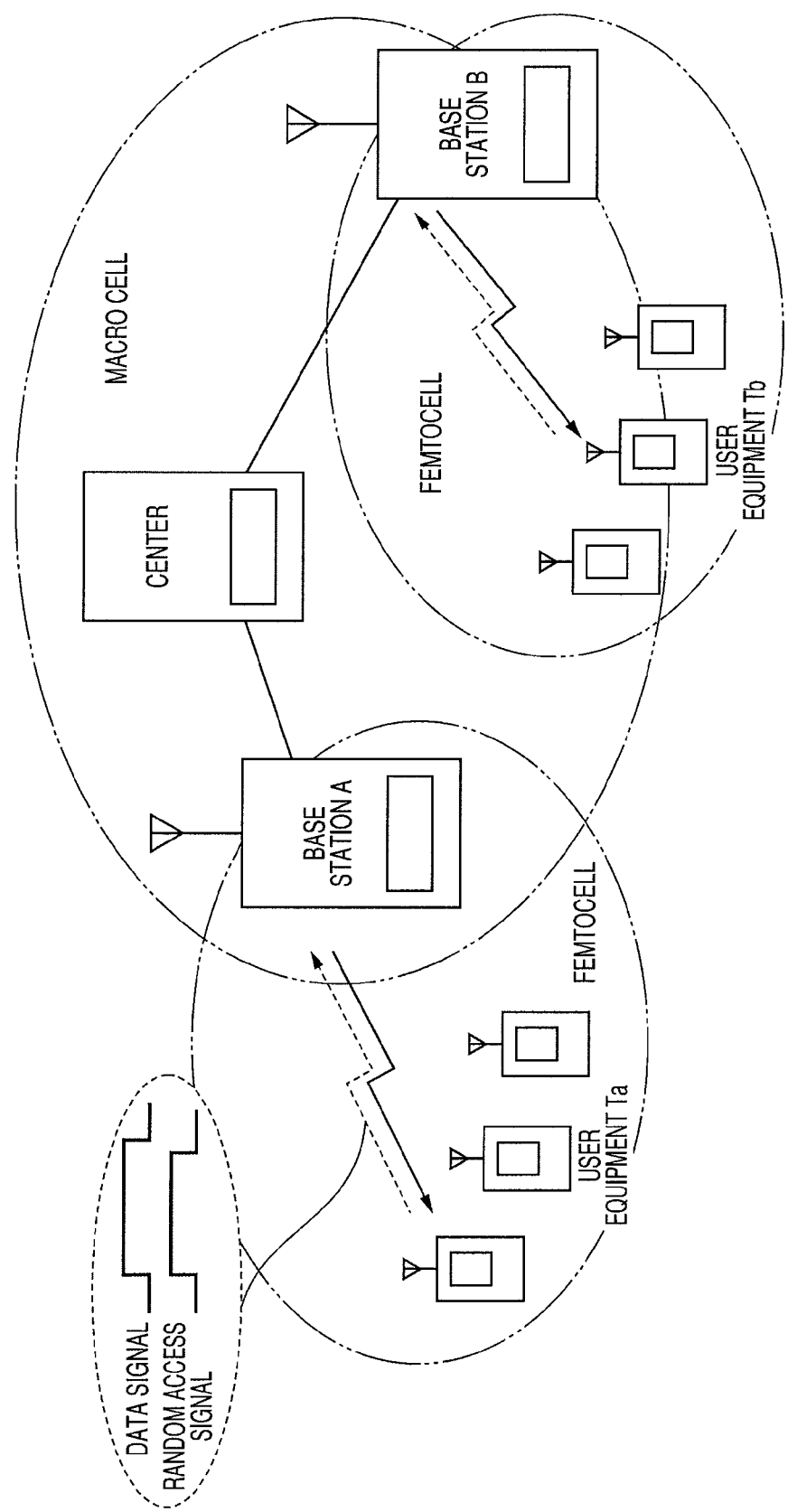
FIG. 10 illustrates a wireless communication system according to a second embodiment of the present invention.
Figure 11:
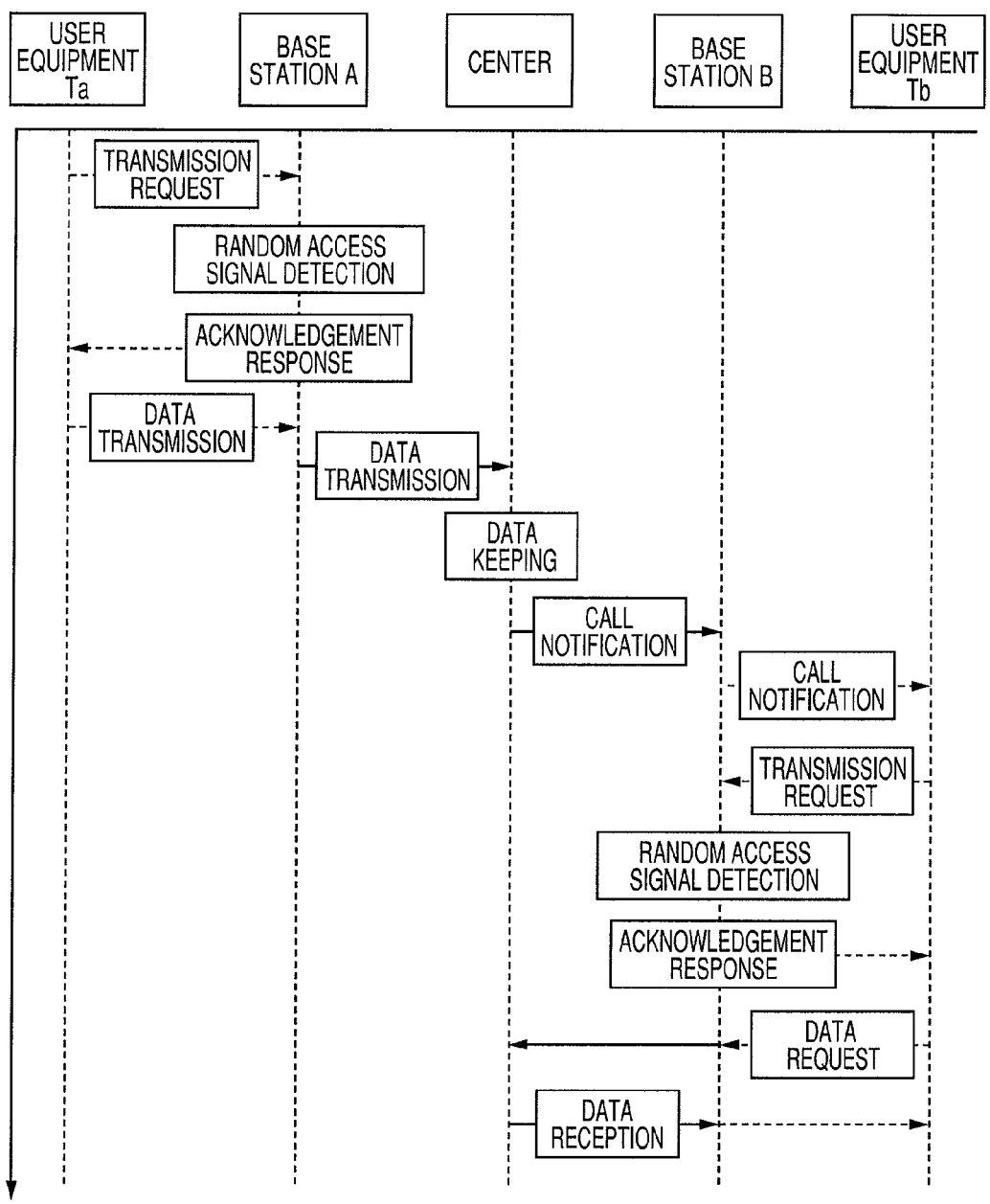
FIG. 11 is a time chart showing an example of performing communication between user equipment according to the second embodiment of the present invention.
Figure 12:
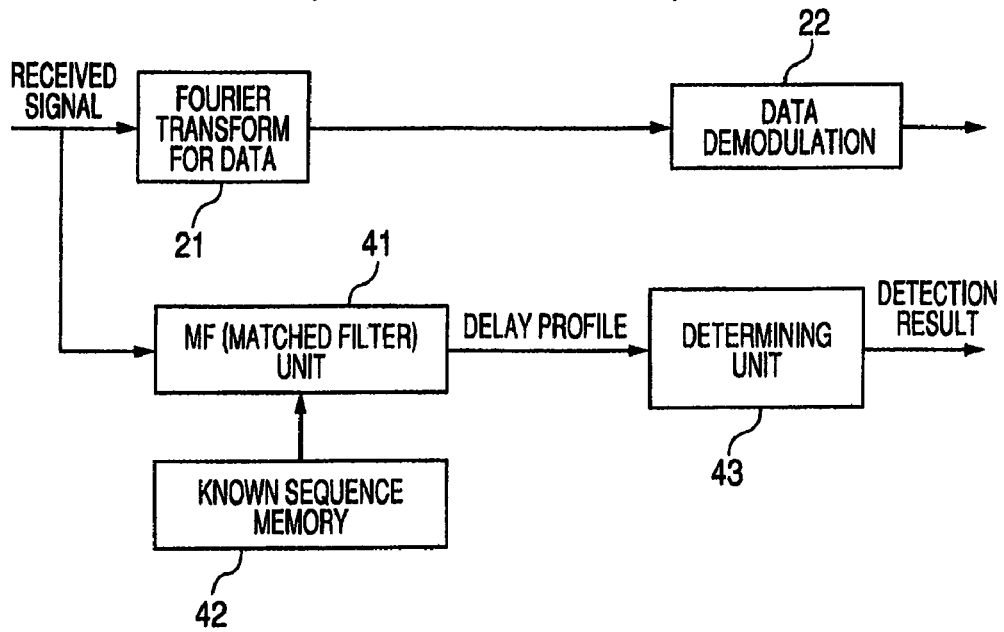
FIG. 12 shows an example of a conventional random access signal detection device.
Figure 13:
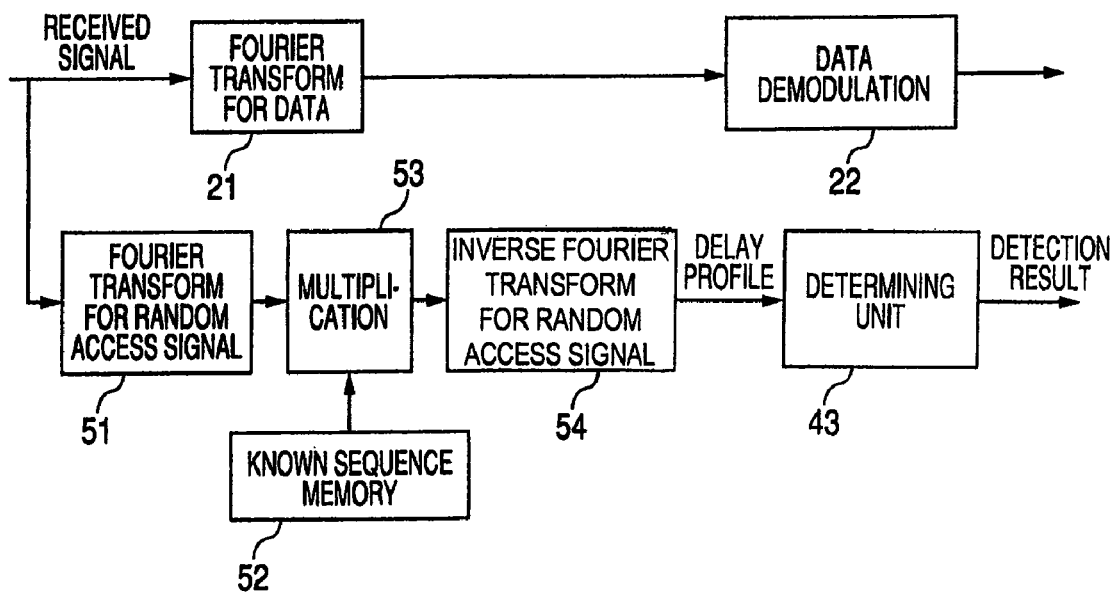
FIG. 13 shows an example of a conventional random access signal detection device.
Figure 14:
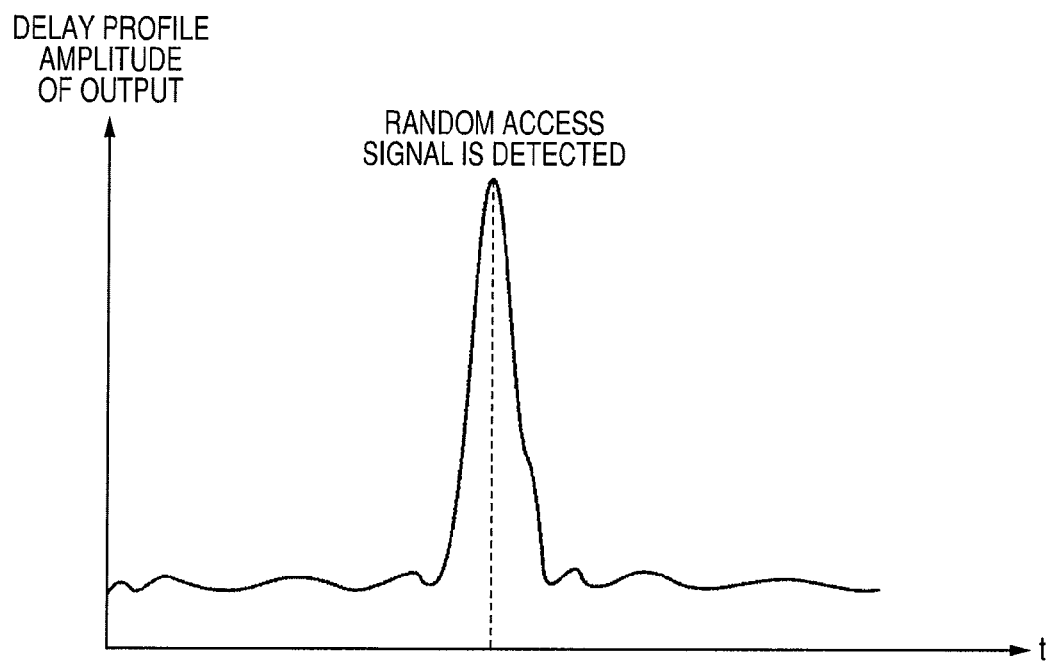
FIG. 14 shows an example of output obtained by a conventional random access signal detection device.

With reference to FIGS. 10 and 11, the following describes a wireless communication system of a second embodiment of the present invention.

The present invention can also apply to communications between different femtocells. For example, as shown in FIG. 10, two femtocells may be configured to be accessible to each other through a communication network, for example, a wired macro cell having a center. Communications are established as shown in FIG. 11 between user equipment Ta within one femtocell having a base station A and user equipment Tb within another femtocell having a base station B. That is, communications within the femtocells are respectively made in such a way that the user equipment sends a random access signal to the base station, which detects the random access signal directed to it by the method shown in FIG. 7. Then, communications are established between the user equipment Ta and Tb through the base station A, the center, and the base station B.

According to this embodiment, in the method by which each base station detects a random access signal transmitted by a user equipment within each femtocell, a dedicated MF meeting the signal format of the random access signal, or both Fourier transform and inverse Fourier transform meeting the format of the random access signal can be omitted, so that simplified base stations and reduction in costs can be achieved. Correlation computations or multiplication computations can also be omitted. Especially, in cell environments having a small number of users, for example, in a small-scale base station operated indoor or within an office, the amount of computations and device costs can be reduced.

Since the present invention relates to receiver construction, it can be easily applied to wireless communication systems, which have already decided their transmission methods. Furthermore, since the present invention relates to receiver construction, combined use with the conventional art is enabled even in large-scale base stations operated in environments in which there are a large number of users.

What is claimed is:

1. A wireless communication equipment comprising receive processing and transmit processing,
   wherein the receive processing includes:
   a Fourier transform unit that transforms all received signals to frequency region signals by Fourier transform;
   a demodulation unit that demodulates the received signals from the Fourier-transformed frequency region signals; and
   a random access detection unit that monitors signals in frequency regions of random access signals of the Fourier-transformed frequency region signals, and detects that the random access signals are received, by a change pattern of the signals in the frequency regions of random access signals in one transmission time interval,
   wherein the Fourier transform unit is a Fourier transform unit for data signals,
   wherein the random access detection unit, for frequency region signals transformed from the received signals by the Fourier transform unit for data signals, monitors power in bands allocated to the random access signals, and detects whether the random access signals are received using a change pattern of the power in the one transmission time interval,
   wherein the received signals include data signals for transmitting information, and the random access signals transmitted by user equipments for sending a transmission request to a base station, and
   wherein the random access detection unit reflects the difference between the format of the random access signals and the format of the data signals on a change pattern of power, and detects the random access signals.

2. The wireless communication equipment according to claim 1,
   wherein the received signals are signals of frequency-division-based methods (e.g., single carrier FDMA, OFDM, and OFDMA), and
   wherein the random access detection unit determines that a random access signals is received when, in comparison at each sub-transmission time interval of one-fourteenth of the one transmission time interval, the output of the last sub-transmission time interval of the format obtained by Fourier-transforming the random access signals is low, and the output of the last sub-transmission time interval of the format obtained by Fourier-transforming the data signals is high.

3. The wireless communication equipment according to claim 2,
   wherein the random access signals are transmitted and received within a femtoCell.

4. A wireless communication system which comprises a base station and plural user equipments and in which communications of an uplink from the each user equipment to the base station are performed by a frequency-division-based method,
   wherein the base station includes receive processing and transmit processing, and
   wherein the receive processing includes:
   a function that transforms all received signals to frequency region signals by Fourier transform; and
   a random access detection function that, based on the difference between the format of subframes of data signals prescribed by the frequency-division-based method and the format of random access signals in one transmission time interval of the frequency region signals, determines whether the random access signals are received.

5. The wireless communication system according to claim 4,
   wherein the receive processing includes:
   a Fourier transform unit that transforms all received signals to frequency region signals by Fourier transform; and
   a demodulation unit that demodulates the data signals from the Fourier-transformed frequency region signals; and
   wherein the random access detection function monitors signals in frequency regions of random access signals of the frequency region signals Fourier-transformed in the Fourier transform unit, and detects that the random access signals are received, by a change pattern of the signals in the frequency regions in one transmission time interval.

6. The wireless communication system according to claim 4,
   wherein one femtoCell is formed by the base station and the plural user equipments.

7. The wireless communication system according to claim 6,
wherein the plural femtoCells are connected through a communication network.

8. A random access signal detection method in a wireless communication system in which a base station detects random access signals transmitted by user equipments to send a request to transmit a data signal to the base station, the random access signal detection method comprising the steps of:
performing communications of uplinks from the user equipments to the base station by a frequency-division-based method; and
in receive processing of the base station,
transforming all received signals to frequency region signals by Fourier transform; and
based on the difference between the format of subframes of data signals and the format of random access signals in one transmission time interval of the frequency region signals, determining whether the random access signals are received.

9. The random access signal detection method according to claim 8, comprising the steps of:
transforming signals received by the base station to frequency region signals by a Fourier transform unit for data signals;
monitoring power of bands used by the random access signals of the frequency region signals; and
determining whether the random access signals are received, by a change pattern of the power in one transmission time interval.

10. The random access signal detection method according to claim 8,
wherein the user equipments form a femtoCell with the base station, and
wherein communications of uplinks from the user equipments to the base station are performed by a frequency-division-based method.

* * * * *